United States Patent [19]

Swenson

[11] Patent Number: 5,116,072
[45] Date of Patent: May 26, 1992

[54] BALL HITCH WITH ROTATABLE BALL

[76] Inventor: John C. Swenson, 110 S. 200 East, Springville, Utah 84663

[21] Appl. No.: 569,829

[22] Filed: Aug. 20, 1990

[51] Int. Cl.$^5$ .............................................. B60D 1/06
[52] U.S. Cl. .................................... 280/511; 403/131; 403/378; 403/379
[58] Field of Search ................. 280/511, 416.1; 403/3, 403/131, 328, 378, 379, 165, 78; 24/573, 514, 569; 277/173, 174; 411/354, 396, 513, 514, 515; 16/121, DIG. 40, DIG. 41

[56] References Cited

U.S. PATENT DOCUMENTS

| | | | |
|---|---|---|---|
| 479,146 | 7/1892 | Williams | 403/328 |
| 2,202,371 | 5/1940 | Bruckman | 16/121 |
| 3,796,464 | 3/1974 | Hansen et al. | 403/378 |
| 4,344,516 | 8/1982 | Kolb | 403/379 |
| 4,596,406 | 6/1986 | Van Vleet et al. | 280/511 |
| 4,889,356 | 12/1989 | Morris | 280/511 |

FOREIGN PATENT DOCUMENTS

| | | | |
|---|---|---|---|
| 0371750 | 6/1990 | European Pat. Off. | 280/511 |
| 0020223 | 11/1904 | Sweden | 403/378 |
| 2221249 | 1/1990 | United Kingdom | 403/379 |

Primary Examiner—Charles A. Marmor
Assistant Examiner—A. M. Boehler
Attorney, Agent, or Firm—Thorpe, North & Western

[57] ABSTRACT

A post and ball type hitch apparatus intended for use with a conventional hitch socket is disclosed. The apparatus includes a post formed of a generally elongate cylindrical member having a top portion, a central portion and a bottom portion. The bottom portion of the post is adapted to attach to a bumper or frame of a vehicle, and the top portion of the post includes an annular groove therein. The apparatus also includes a ball having a cylindrical channel formed therein, for insertion thereof over the top portion of the post, and a cylindrical bore formed therethrough which intersects the cylindrical channel in such a manner that the bore of the ball is co-extensive with a portion of the annular groove of the post when the post is inserted into the cylindrical channel. The apparatus also includes a cylindrical pin which can be inserted through the bore and which becomes engaged with a portion of the annular groove of the post in order to secure the post in the cylindrical channel of the ball. When thus connected, the post and the ball can rotate relative to each other without causing sheering forces to be applied to the pin, the pin being allowed to slide in the annular groove as the ball rotates relative to the post.

1 Claim, 2 Drawing Sheets

BALL HITCH WITH ROTATABLE BALL

BACKGROUND OF THE INVENTION

1) Field of the Invention.

This invention relates generally to a hitching apparatus. More particularly, the present invention relates to a post and ball type hitching apparatus.

2) Prior Art.

Post and ball type hitching apparatuses are very commonly used for the attachment of vehicles to be towed, such as a boat, trailer, etc., to the rear of a towing vehicle such as a car, truck or tractor. Common prior art post and ball type hitching apparatuses include a post which is rigidly fixed to the rear of a towing vehicle so as to extend generally vertically above a bumper or similar supporting member, and a ball fixedly attached to the post. The ball is sized to allow its insertion into a socket which is usually unitarily formed as part of a tongue or forward frame member of the vehicle to be towed. The socket is placed over the ball and secured thereto in a manner which allows rotation of the socket relative to the ball, but prevents separation thereof. This type of connection is commonly accepted as being relatively safe to use, and relatively simple to connect and disconnect.

Although post and ball type hinging apparatuses generally function well for their intended purposes, there nevertheless remains several problems which have heretofore been unaddressed, and unresolved by the prior art. For example, not all sockets which are incorporated into vehicles to be towed, are of the same size. Therefore, a single ball on a post and ball type hitching apparatus may not suffice for use with all vehicles which one may desire to tow. Because of this, it is often desirable to be able to quickly remove the ball from the post and replace it with a different size ball which will match the socket of the vehicle to be towed.

U.S. Pat. No. 4,596,406 to Van Vleet et al. discloses a quick change ball hitch apparatus which is exemplary of the prior art efforts to design a post and ball type hitching apparatus which allows for quick and simple exchange of the ball.

The ball of the Van Vleet et al. device is secured to a post by a pin, which passes through a bore centrally located through the ball and the post. The pin holds the ball in generally fixed relationship relative to the post and prevents inadvertent separation of the ball and post during use. The pin is prevented from inadvertent removal from the bore whenever a socket is placed thereover. Detachment of the ball from the post at any time during use is therefore prevented.

The disclosure of the Van Vleet et al. patent is very thorough in its description of prior art problems with regard to quick changeability of prior art hitch apparatuses, and in the advantages of a post and ball type hitch apparatus which incorporates a pin to effect connection between the post and ball thereof during use. The Van Vleet et al. patent is hereby incorporated into this disclosure by reference.

Although the Van Vleet et al. patent is somewhat successful in solving prior art problems directed to the speed and ease of exchanging balls on a post and ball type hinge apparatus, there nevertheless remain several unresolved problems with its use. One of the most important problems arises from the inability of the ball to rotate relative to the post when secured by the pin. Although in the ideal situation, it is intended that a vehicle to be towed be attached to the hitch in such a way that the socket remain rotatable relative to the ball, in actual practice, insufficient lubrication between the socket and the ball (or foreign objects trapped therebetween) can seriously inhibit or even prevent relative rotation. In such instances, the Van Vleet et al. device can easily fail due to sheer forces imparted on the pin due to a misfunctioning ball and socket connection. In other words, if in use, the socket of a towed vehicle cannot freely rotate relative to the ball of the hitch, the ball will be forced to rotate relative to the post, thus sheering the pin and allowing the ball to subsequently become disconnected from the post.

Therefore, there exists a need for a post and ball type hitch apparatus which allows for quick and easy connection and disconnection of the post and ball, yet which also allows for relative rotation of the post and ball without shearing or destruction of the connector pin.

OBJECTS AND SUMMARY OF THE INVENTION

A principle object of the present invention is to provide a post and ball type hitch apparatus which includes a secure yet rotatable connection between the ball and post thereof.

It is another object of the present invention to provide a ball and post type hitch apparatus which includes a pin type connector which allows for quick and easy connection and disconnection of the ball from the post thereof.

Another object of the present invention is to provide a post and ball type hitch apparatus in which the ball thereof is easily detachable from the post and interchangeable with other balls.

These and other objects of the present invention are disclosed in a preferred embodiment of a post and ball type hitch apparatus which includes a post having a positioning flange attached generally centrally thereof, the bottom portion of the post being adapted (such as by including threads thereon) to be attached to the bumper or frame of a towing vehicle, and the upper portion thereof having an annular groove formed therein. A ball is formed with a cylindrical channel passing partly therethrough, which is of a diameter slightly greater than the diameter of the upper portion of the post, and into which the post may be inserted. The ball also includes a bore which is generally perpendicular to, and off-centered from the longitudinal axis of the cylindrical opening. The bore is aligned with the annular groove of the post in such a manner that a pin passing through the bore intersects a portion of the groove of the post in order to lock the ball in position thereon. In use, since the annular groove extends around the entire circumference of the shaft, rotation of the ball relative to the shaft merely causes the pin to slide in the annular groove, and shearing forces on the pin are avoided.

BRIEF DESCRIPTION OF THE DRAWINGS

In the drawings, in which identical elements of each of the various figures are similarly numbered.

FIG. 5 is a cross sectional view similar to FIG. 4 and showing the pin disengaged from the groove of the post.

DETAILED DESCRIPTION OF THE INVENTION

Figure 1:
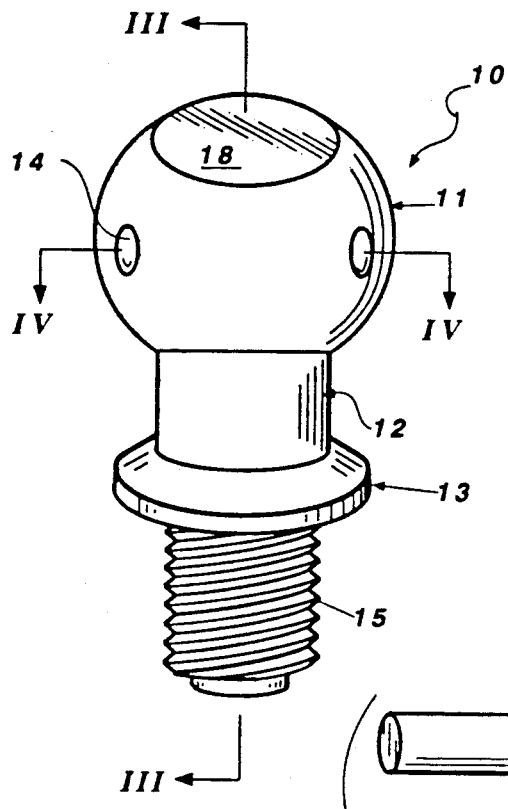
FIG. 1 shows a perspective view of a post and ball type hitch apparatus formed in accordance with the principles of the present invention.

Referring now to the drawings, FIG. 1 shows a ball hitch 10 formed in accordance with the principles of the present invention. The hitch 10 includes a post 12 which has attached at the central portion thereof, an annular flange 13 and at a top portion thereof, a ball connector 11. The ball connector 11 is fixed for rotational movement relative to the post 12 by means of connector pin 14 in a manner which will be explained below.

The post 12 is formed as a generally cylindrical rod shaped element with the bottom portion 24 thereof including threads 15 to which a threaded nut (not shown) or other similar threaded element may be attached for securing the hitch 10 to the bumper or frame of a vehicle.

Figure 2:
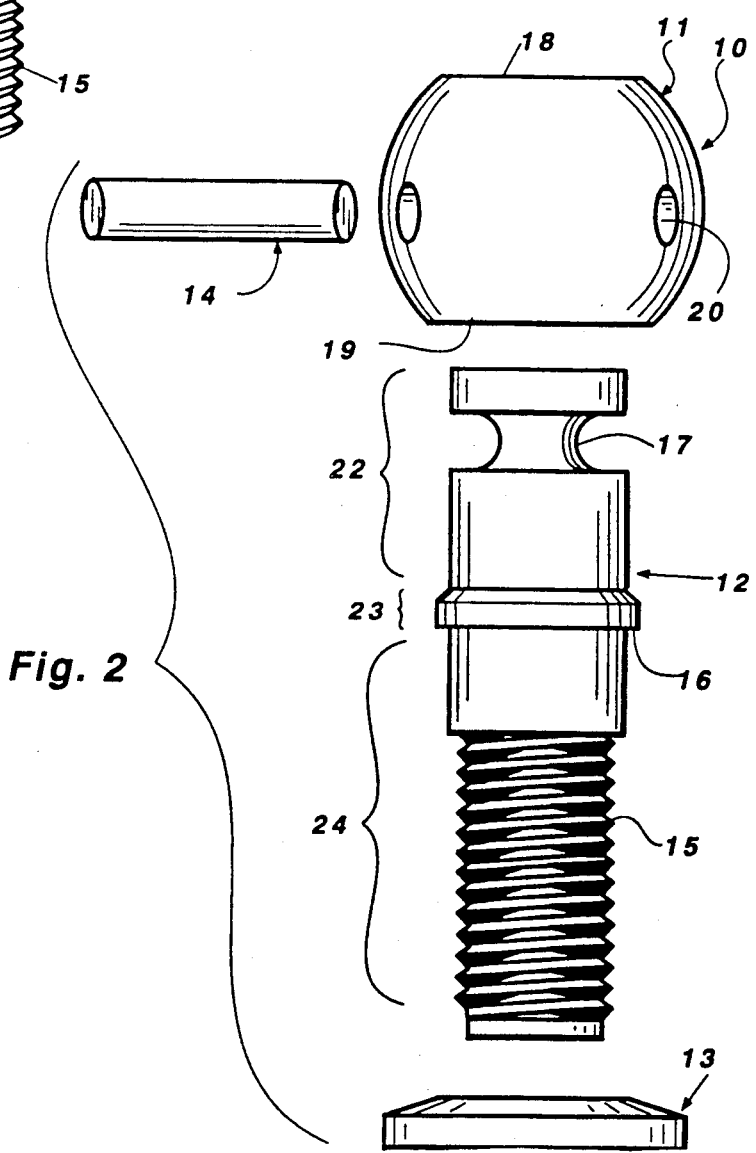
FIG. 2 shows an expanded view of the post and ball type hitch apparatus of the present invention with each of the main structural elements thereof separately shown.

As best seen in FIG. 2, the bottom portion 24 of post 12 is of the same diameter as the top portion 22 thereof. The central portion 23 of post 12 includes a shoulder 16 formed so as to make the diameter greater than top portion 22 and the bottom portion 23.

Flange 13 is generally annular in shape having an inner diameter approximately equal to the diameter of the bottom portion 24 of post 12. In construction, the bottom portion 24 is inserted through the flange 13 and press-fit up against shoulder 16. The flange 13 is press fit and tested to withstand a 14,000 pound load, which is at least twice the Federal Government load test requirement.

The flange 13 functions to contact the top portion of a frame or bumper though which the post 12 has been inserted. When the hitch 10 is attached to a bumper or frame of a vehicle, the bottom portion of post 12 may be inserted through an opening in the bumper or frame until flange 13 rests on the surface thereof. A nut or similar threaded element may then be screwed onto threads 15 to securely position the post 12 in fixed position in any manner well known in the art.

It is to be understood that the shown structure used for attaching the hitch 10 to a vehicle frame or bumper is only illustrative of the manner of attachment of the preferred embodiment of the present invention. Other prior art methods of attaching a post to a vehicle frame or bumper may be substituted for that shown in the preferred embodiment without departing from the spirit and scope of the present invention.

The upper portion 22 of post 12 has an annular groove 17 formed therein which extends around the entire circumference of the post 12 and is oriented generally perpendicularly with the longitudinal axis 25 of the post 12 (see FIG. 3), at a uniform radial distance therearound. The width of groove 17 is designed so as to be only slightly greater than the diameter of the connector pin 14 for reasons which will become evident below.

Ball connector 11 is generally spherical in shape, having a flattened top surface 18 and a similarly flattened bottom surface 19. The bottom surface 19 is slightly larger in area than the top surface 18, and is formed in a plane substantially parallel to the plane of top surface 18.

Figure 4:
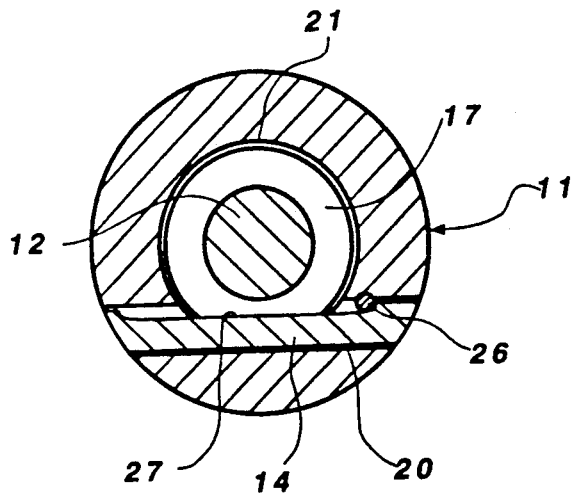
FIG. 4 is a cross sectional view of the post and ball type hitch apparatus taken along line IV—IV of FIG. 1.
Figure 5:
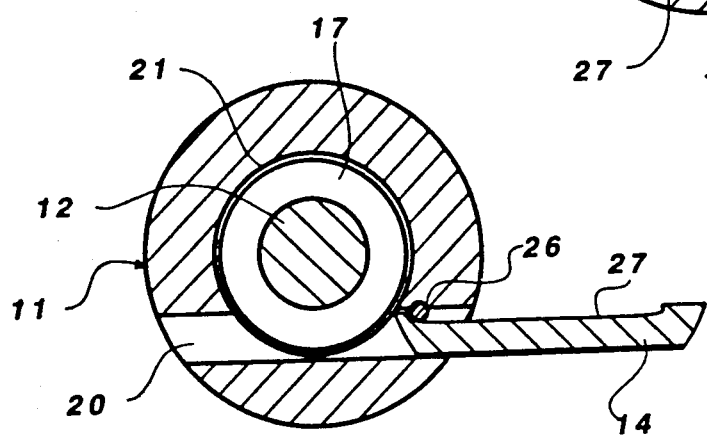
FIG. 5 is a cross sectional view of the post and ball type hitch apparatus similar to FIG. 4 except showing the connector pin partially removed.

Ball 11 also includes a nonradial, smooth, transverse bore 20 which extends completely therethrough in a direction generally parallel to the surfaces 18 and 19 of the bore 20 and is set off from the longitudinal axis 25 and has a diameter slightly greater than the diameter of connector pin 14, and generally equal to the width (a) of groove 17. The connector pin 14 is generally cylindrical in shape and of a length which is approximately equal to the length of bore 20. Connector pin 14, as shown in FIGS. 4 and 5, has first and second end portions which are secured within the ball connector 11, and a middle portion which intersects a portion of the annular groove 17 to prevent removal of the post 12 from the cylindrical channel 21 of ball connector 11 as explained hereafter. The pin includes a notch 27 (see FIG. 4 & 5) therein which cooperates with rod 26 (see FIGS. 4 & 5) in the ball 11.

Figure 3:
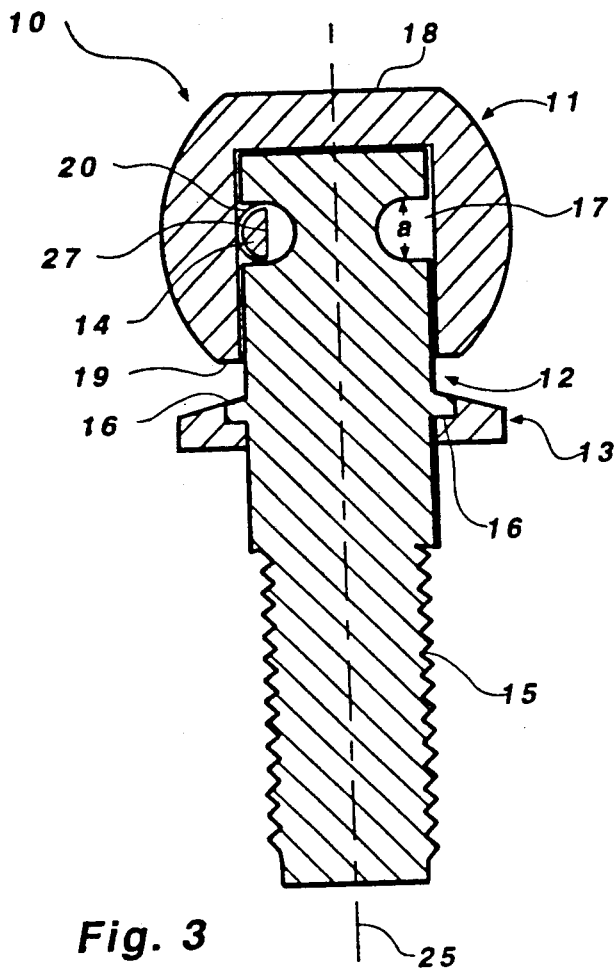
FIG. 3 is a cross sectional view of the post and ball type hitch apparatus taken along line III—III of FIG. 1.

As best seen in FIG. 3, ball 11 has a cylindrical channel 21 formed through the center of bottom surface 19 thereof. The longitudinal axis of channel 21 is generally perpendicular to the plane of the bottom surface 19. The cylindrical channel 21 extends through a substantial portion of the ball 11 and intersects the bore 20 thereof. The cylindrical channel 21 is formed to a diameter which is slightly greater than the external diameter of the upper portion 22 of post 12 so as to allow post 12 to be inserted therein.

The upper portion of post 12 can be inserted into the cylindrical channel 21, and as best shown in FIG. 3 and FIG. 4, the annular groove 17 thereof is located on post 12 so as to be positioned in alignment with bore 20 of the ball 11 when the post 12 is inserted into the cylindrical channel 21. When in this position, the longitudinal axis of cylindrical channel 21 coincides with longitudinal axis 25 of the post 12, and the middle portion of connector pin 14 is located in cylindrical channel 21 and partially surrounded by the annular groove 17. Since the annular groove 17 is of a width which is only slightly greater than the diameter of counter pin 14, the post 12 is held in its position relative to ball 11 whenever pin 14 is inserted completely into bore 20.

As is evident in FIG. 4, should ball 11 be forced to rotate about the longitudinal axis 25 of post 12, pin 14 can freely slide around annular groove 17. Since pin 14 is allowed to slide in annular groove 17, forces tending to cause relative rotation between ball 11 and post 12 can not generate a shearing force in pin 14. Therefore, if a socket is secured over ball 11 and prevented from rotating relative thereto due to lack of lubrication (or a trapped foreign object), ball 11 will rotate relative to post 12 instead of being sheared off as a result of the rotational forces. Rotation of ball 11 relative to post 12 will not cause a failure of the connection pin 14 and subsequently will not allow ball 11 to become disconnected from the post 12.

As can be readily seen in FIG. 5, should one desire to exchange ball 11 for a different ball, it is a simple matter to slide connector pin 14 out of bore 20 until it is disengaged from groove 17 of the ball 11 (the rod 26 allows pin 14 to slide only within the constraints of notch 27).

The ball 11 can then be removed from post 12. A new ball may then be placed over post 12 and reconnected by pin 14 in a quick and simple manner.

It is to be understood that the above described embodiment of the present invention is only illustrative of the application of the principles thereof. Numerous modifications and alternative embodiments or arrangements may be devised by those skilled in the art without departing from the spirit and scope of the present invention and the appended claims are intended to cover such modifications and arrangements.

I claim:

1. A post and ball type hitch apparatus for use with a conventional hitch socket, comprising:

a generally cylindrical post having a top portion, a bottom portion and a longitudinal axis, the top portion having an annular groove which is perpendicular to the longitudinal axis and the bottom portion having means for attaching the port to a vehicle, a ball connector having a cylindrical channel formed therein for insertion onto the top portion of the post, and a nonradial, smooth, transverse bore offset from the longitudinal axis, the bore intersecting the cylindrical channel, and a connector pin having first and second end portions and a middle portion, and sized so as to be insertable into the bore such that the first and second end portions are secured within the ball connector and the middle portion intersects a portion of the annular groove to prevent removal of the post from the cylindrical channel, while at the same time allowing relative rotation of the ball connector about the cylindrical post;

wherein the pin includes a notch which cooperates with a rod in the ball connector, the rod allowing the pin to move only within the constraints of the notch.

* * * * *